Dec. 23, 1969 — G. SOTEROPULOS ET AL — 3,485,016
MACHINE FOR WAFERING HAY AND LIKE CROPS
Filed Jan. 15, 1968 — 2 Sheets-Sheet 1

INVENTORS
GUST SOTEROPULOS &
M. E. McCLELLAN

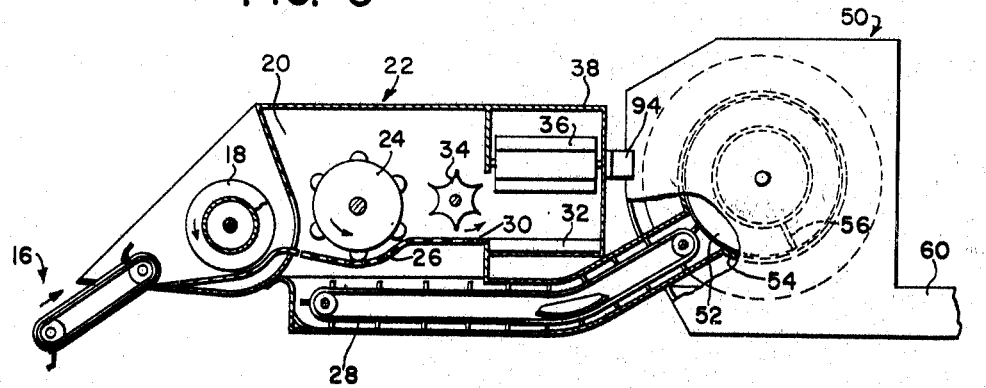
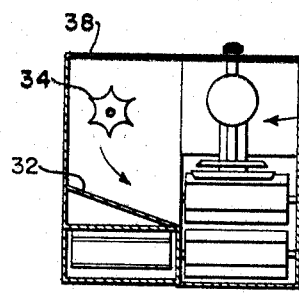
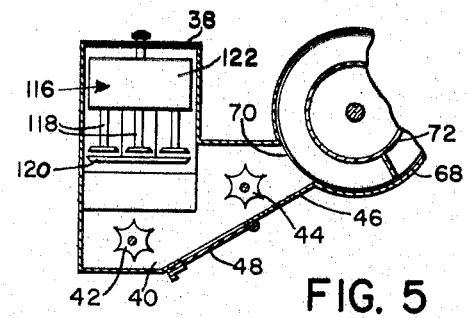
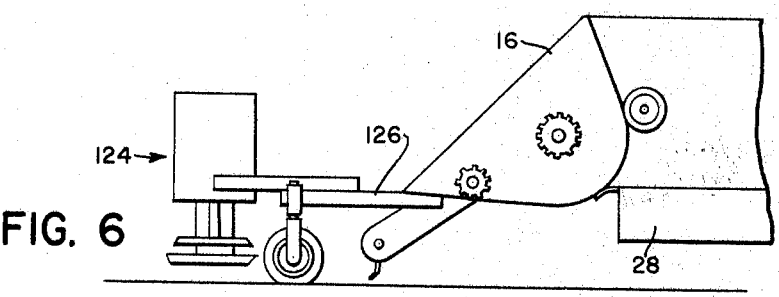
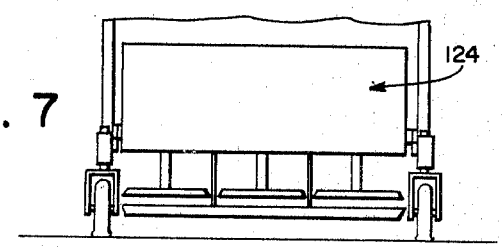

United States Patent Office 3,485,016
Patented Dec. 23, 1969

3,485,016
MACHINE FOR WAFERING HAY AND LIKE CROPS
Gust Soteropulos and Marcus Earl McClellan, Ottumwa, Iowa, assignors to Deere & Company, Moline, Ill., a corporation of Delaware
Filed Jan. 15, 1968, Ser. No. 697,931
Int. Cl. B30b 7/00
U.S. Cl. 56—1                                    21 Claims

ABSTRACT OF THE DISCLOSURE

A hay-wafering machine for handling previously harvested crops, such as hay or the like made up of stems and leaves, having means for separating the leaves from the stems and subsequently compacting the leaves separately into wafers or pellets for use as animal food.

BACKGROUND OF THE INVENTION

This invention relates to improvements in machines for wafering hay and like forage crops. Such machines are known, operating generally on the pirnciple of agricultural baling, at least to the extent that previously mowed hay is laid into windrow and the machine is equipped with a crop pickup mechanism for picking up the hay and feeding it through other mechanisms and ultimately to die means in which the hay is compacted into wafer or pellet form. A representative machine is disclosed in U.S. Patent 3,274,761.

It is important in the operation of machines of this character that the hay must be cured to approximately under 12% moisture content. In some areas, it is not too difficult to achieve this moisture level, but in other areas, because of variations in climate, many problems are encountered in the attainment of the proper moisture level. The problem is further complicated by the fact that the leaves cure well ahead of the stems and even though the hay in general, while lying in the windrow, may be at a 20% moisture level, it will be found that the leaves are approximately 10% and the stems 30%, meaning that the leaves are substantially too dry and the stems are not dry enough.

SUMMARY OF THE INVENTION

According to the present invention, the leaves and stems are picked up together and the leaves are separated from the stems and cubed separately. The stems may be returned to the ground or may be subsequently treated and compacted, as in a separate wafering or pelleting unit.

Since the leaves contain by far the greater proportion of nutrient, the wafered or cubed leaves turn out to be a highly valuable product. Further, alfalfa leaf cubes or meal are becoming increasingly popular in the poultry feed business because of the high protein content of the leaves and the high concentration therein of Xanthophyll, which is useful as a pigment to increase the yellow color in the shanks, skin and other tissues of the poultry.

It is a further feature of the invention to provide a self-propelled machine equipped with means for assisting in the curing of the hay, either in the windrow or subsequently to separating the leaves from the stems, in the latter case, the auxiliary curing means acting on the stems so that they too can be wafered or cubed as part of the overall operation. These improvements make the machine quite versatile and enable it to operate in areas in which the moisture content varies rather widely.

DESCRIPTION OF THE DRAWINGS

FIG. 3 is an enlarged fragmentary section as seen generally along the line 3—3 of FIG. 1.

FIG. 4 is a transverse section as seen along the line 4—4 of FIG. 2.

FIG. 5 is an enlarged longitudinal section as seen along the line 5—5 of FIG. 1.

FIG. 6 is a fragmentary elevation of the forward portion of a machine equipped with a heating means ahead of the pickup.

FIG. 7 is a front view of the structure shown in FIG. 6.

DESCRIPTION OF THE PREFERRED EMBODIMENTS

Figures 1, 2:
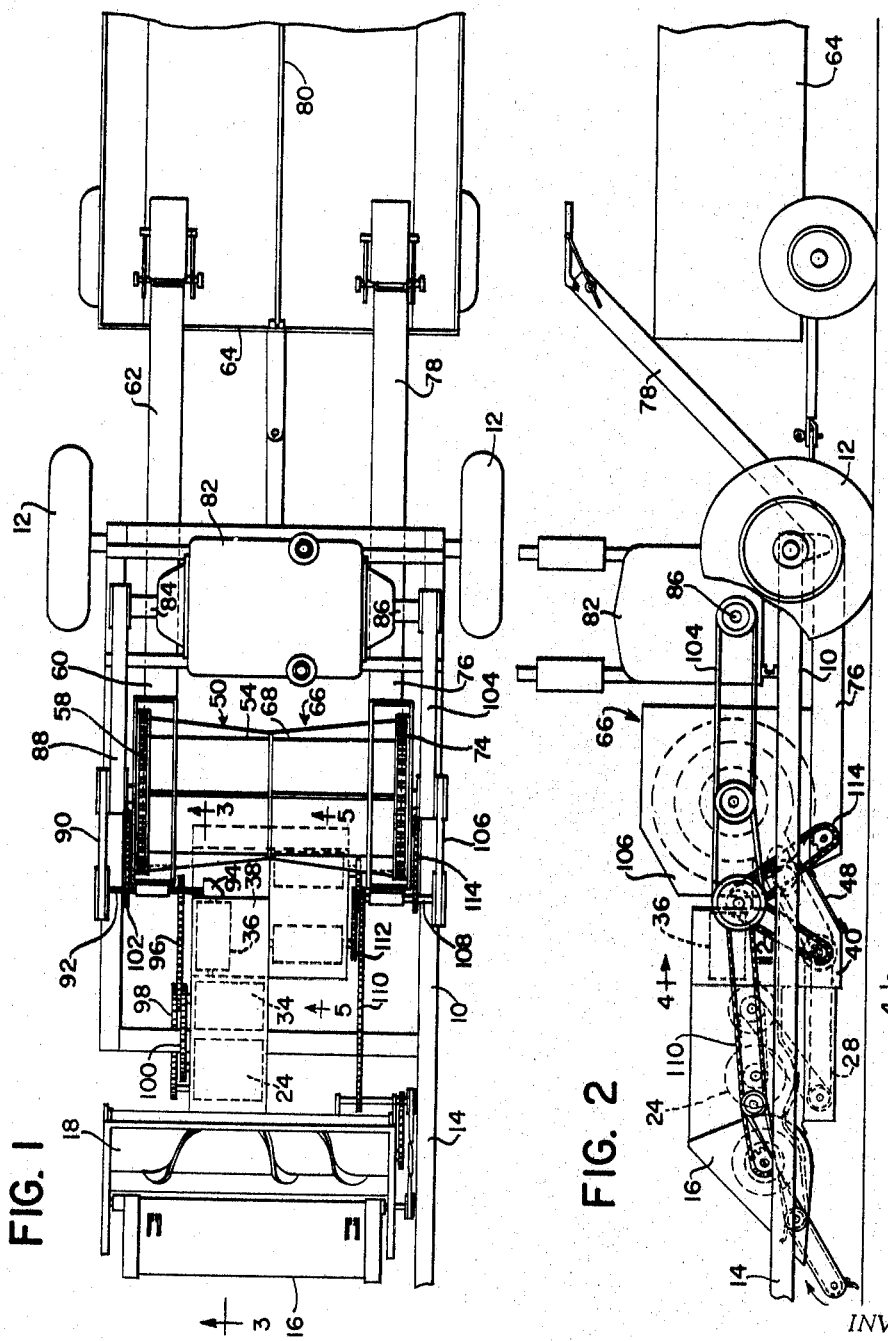
FIG. 1 is a plan view, with portions broken away, of a typical mobile wafering unit.
FIG. 2 is a side elevation of the same.

The machine includes a fore-and-aft frame means 10 carried on a pair of ground wheels 12 and having a forwardly extending draft tongue 14 for connection to any suitable source of propelling power, such as a tractor (not shown).

The forward portion of the frame means 10 carries thereon a pickup 16 of any of the well-known types, such as that disclosed in the patent identified above. This pickup picks up crops from the windrow and causes them to move rearwardly to a transverse auger 18, which functions to narrow the crop stream laterally and to feed it rearwardly into the feed inlet or throat 20 of separating means 22. This means includes a rotatable drum 24, which may be typical of those used in the conventional threshing mechanism of a combine. The drum 24 cooperates with a concave 26 through which the leaves drop to fall upon a rearwardly and upwardly extending conveyor 28, the stems being ejected rearwardly over a concave extension 30 to fall upon a transverse divider or inclined floor 32. The stems are assisted rearwardly by a transverse beater 34 located just behind the threshing drum 24. A beater 36, rotatable on a fore and aft axis, and located in a housing 38 of which the divider or floor 32 forms a part, causes the separated stems to move downwardly and laterally for discharge or collection on an upwardly and rearwardly extending second feed means 40. This feed means includes a pair of beaters 42 and 44 to assist the stems in their movement rearwardly and upwardly. The bottom of this means includes a floor 46 in which is a removable door 48 which, when removed or opened, permits the stems to be returned to the ground rather than rearwardly to means to be described later.

From the description thus far, it will be seen that the windrow is picked up by the pickup 16, fed to the separating means 22, and the leaves and stems are then separated, the leaves continuing downwardly into the feed means represented by the conveyor 28 and the separated stems being transferred laterally to the other conveyor means 40.

Just rearwardly of the conveyor 28 is a first compression or compacting means, here shown as being of the rotary extrusion die type such as that in the patent identified above. For purposes of general identification, this die means bears the numeral 50. As best seen in FIG. 3, the conveyor 28, which is of the undershot type, delivers upwardly and rearwardly through an opening 52 in a cylindrical casing 54 in which an auger 56 is rotatable to move the crops to the right-hand side of the machine for subsequent extrusion through a plurality of radial dies 58, the extruded or cubed leaves dropping thence onto a collector or conveyor means 60 which continues rearwardly and upwardly as a wagon elevator 62 for discharging the cubed leaves into a partitioned trailer or wagon 64 towed behind the machine in conventional fashion.

In a preferred arrangement, a second and similar die means 66 is located coaxially alongside the die means 50. The means 66 includes a cylindrical casing 68 having an opening 70 into which the feed means 40 delivers. An auger 72 in the casing 68 augers the stems to the left for compaction and extrusion by a plurality of radial dies 74, the wafered or cubed stems dropping into collecting or conveyor means 76 which extends rearwardly and upwardly as a wagon elevator 78 for discharging the cubed stems into the wagon 64 apart from the cubed leaves, because the wagon has a longitudinal partition 80 therein.

Likewise in a preferred construction, the two die means, the separating means etc. may be powered by an internal combustion engine 82, here disposed behind the two die means with its length transverse to the longitudinal center line of the frame means 10. The right-hand end of the engine crankshaft serves as a power shaft 84 and the left-hand end serves as a second power shaft 86. Any conventional form of drive means may be relied upon, that shown here constituting in the first place a belt drive 88 to the die means 50 and associated belt and chain drives to the other components at that side of the machne. For example, a second belt 90 drives a transverse shaft 92 and from this shaft drive is taken in turn to the stem beater 36, the cross beater 34 and the threshing drum or cylinder 24. For example, the beater 36 may be driven through a gearbox 94 and the beater 34, drum 24 and leaf conveyor 28 may be driven through a plurality of chains 96, 98 and 100. Another chain 102 is used to drive the rearward conveyor 60.

At the other side of the machine, a drive belt 104 is used to drive the die means 66 from the engine output shaft 86 and a second belt 106 drives a transverse shaft 108 from which various chain drives are taken for the pickup 16 (as at 110), the beaters 42 and 44 as at 112 and the cubed stem conveyor 76, as at 114.

In that form of the invention shown in FIGS. 1–5, means may be provided for at least partially drying the stems before they are delivered to the stem cubing means 66. Such means is best shown in FIGS. 4 and 5, as comprising a heater having a plurality of burners 118 and a flame deflector 120. The heater may be of any known type and is fueled from a tank 122. The heat is applied to the stems as they move laterally and then upwardly on the feed means 40. Thus, when the properly cured leaves are separated and delivered to the die means 50, the stems, which may be too moist for cubing, will be subjected to the application of heat at 116 so that they too have their moisture content lowered to a suitable level.

In that form of the invention shown in FIGS. 6 and 7, a similar heater 124 is disposed ahead of the pickup 16, being supported on an auxiliary frame 126 attached to the pickup. As shown in FIG. 7, the heater extends the full width of the windrow and heat is applied to the entire windrow. Thus, in the event that the windrow moisture is not at a suitable low level, the heater 124 can accomplish this, at least as to the leaves, and the heater 116 may also be used to apply additional heat to the stems after they have been separated from the leaves.

As already indicated, the stems may be returned to the ground by removing or opening the door 48. Likewise, it will be clear that the stems may be simply collected by suitable means (not shown) or may be otherwise treated. The two die means 50 and 66 are representative, of course, of compaction means by which the stems and leaves are handled separately.

What is claimed is:

1. Apparatus for handling previously harvested crops, such as hay and the like, made up of both stems and leaves, comprising frame means; crop-receiving means on the frame means for receiving leaf-stem crops; separating means on the frame means operative to separate the leaves from the stems and to discharge the two into separate streams; compression means on the frame operative to compact the leaves into relatively dense form; and feed means for directing the leaves from the leaf stream to the compression means.

2. The invention defined in claim 1, including means on the frame additional to and separate from the compression means for receiving the stems; and second feed means for directing the stems to the additional means.

3. The invention defined in claim 2, in which the additional means is a further compression means for compressing the stems into relatively dense form.

4. The invention defined in claim 1, including means for directing the stems back to the ground.

5. The invention defined in claim 1 in which the compression means includes a plurality of die means and extrusion means cooperative therewith for forming the leaves into wafers.

6. The invention defined in claim 5, including second compression means on the frame; second feed means for directing the stems to the second compression means, and said second compression means comprising a plurality of die means and extrusion means cooperative therewith for forming the stems into wafers.

7. The invention defined in claim 6, including first and second separate collector means on the frame for receiving and maintaining the leaf wafers separately from the stem wafers.

8. The invention defined in claim 1, including ground-engaging wheel means for carrying the frame over a field of previously harvested crops, and pickup means on the frame means for picking the crops up and for delivering them to the crop-receiving means.

9. The invention defined in claim 8, including drying means carried by the frame for at least partially drying the crops ahead of the pickup means.

10. The invention defined in claim 1, including second compression means on the frame means separate from the first-mentioned compression means, second feed means for directing the stems to the second compression means, and drying means on the frame means between the separating means and the second compression means for at least partially drying the stems.

11. The invention defined in claim 1, in which the frame means extends fore and aft, the separating means is behind the receiving means and ahead of the compression means, the separating means operates to discharge the leaves downwardly and to discharge the stems rearwardly, divider means is provided to keep the stems separate from the leaves, and the feed means for the leaves extends from below the separating means to the compression means and by-passes the divider means.

12. The invention defined in claim 11, including second feed means above and cooperative with the divider means for moving the stems relatively remotely from the leaf feed means.

13. The invention defined in claim 12, including second compression means on the frame means for receiving stems from the second feed means and operative to compact the stems into relatively dense form.

14. The invention defined in claim 13, in which the two compression means are mounted in side-by-side relation.

15. The invention defined in claim 14, in which each compression means includes a plurality of die means and cooperative extrusion meanes for respectively forming wafers of leaves and separate wafers of stems, and first and second collector means are carried by the frame for respectively receiving leaf wafers and stem wafers from the respective compression means.

16. The invention defined in claim 13, including means proximate to the divider means for at least partially drying the stems.

17. The invention defined in claim 1, in which the frame means extends fore and aft, the separating means is behind the receiving means and ahead of the compression means, the separating means operates to discharge the leaves downwardly and to discharge the stems rearwardly, divider means is provided to keep the stems separate from the leaves and to discharge the stems back to the ground, and the feed means for the leaves extends from below the separating means to the compression means and by-passes the divider means.

18. The invention defined in claim 1, in which the frame means extends fore and aft, the separating means is behind the receiving means and ahead of the compression means, the frame means is advanceable over the ground, the receiving means includes pickup means for picking crops up from the ground as the frame means advances, drying means is carried ahead of the pickup means for at least partially drying the crops, the separating means operates to discharge the leaves downwardly and to discharge the stems rearwardly, divider means is provided to keep the stems separate from the leaves, and the feed means for the leaves extends from below the separating means to the compression means and by-passes the divider means.

19. The invention defined in claim 1, in which the frame means extends fore and aft, the crop-receiving means includes a fore-and-aft throat leading to the separating means, the separating means includes a separating drum rotatable about a transverse axis and a concave member below said drum to discharge the leaves downwardly and the stems rearwardly, divider means for directing the separated stems away from the separated leaves, and the feed means for the leaves extends from below the separating means to the compression means and beneath and in by-passing relation to the divider means.

20. The invention defined in claim 19, in which the divider means extends transversely and downwardly and includes movable means for moving the stems transversely and downwardly.

21. Apparatus for handling previously harvested crops, such as hay and the like, made up of both stems and leaves, comprising frame means; crop-receiving means on the frame means for receiving leaf-stem crops; separating means on the frame means operative to separate the leaves from the stems and to discharge the two into separate streams; means on the frame for at least partially drying the stems while they are separated from the leaves; and compressing means on the frame operative to compact the leaves and stems.

References Cited

UNITED STATES PATENTS 3,162,003  12/1964  Schapansky _____ 56—1
3,274,761  9/1966  Soteropulos et al. _____ 56—1

ANTONIO F. GUIDA, Primary Examiner

U.S. Cl. X.R.

100—137